Sheet 1, 2 sheets
L. Disbrow.
App's. for Boring in Earth.
RX NO. 57
REISSUED OCT. 20, 1843
6212X RELATED DOC
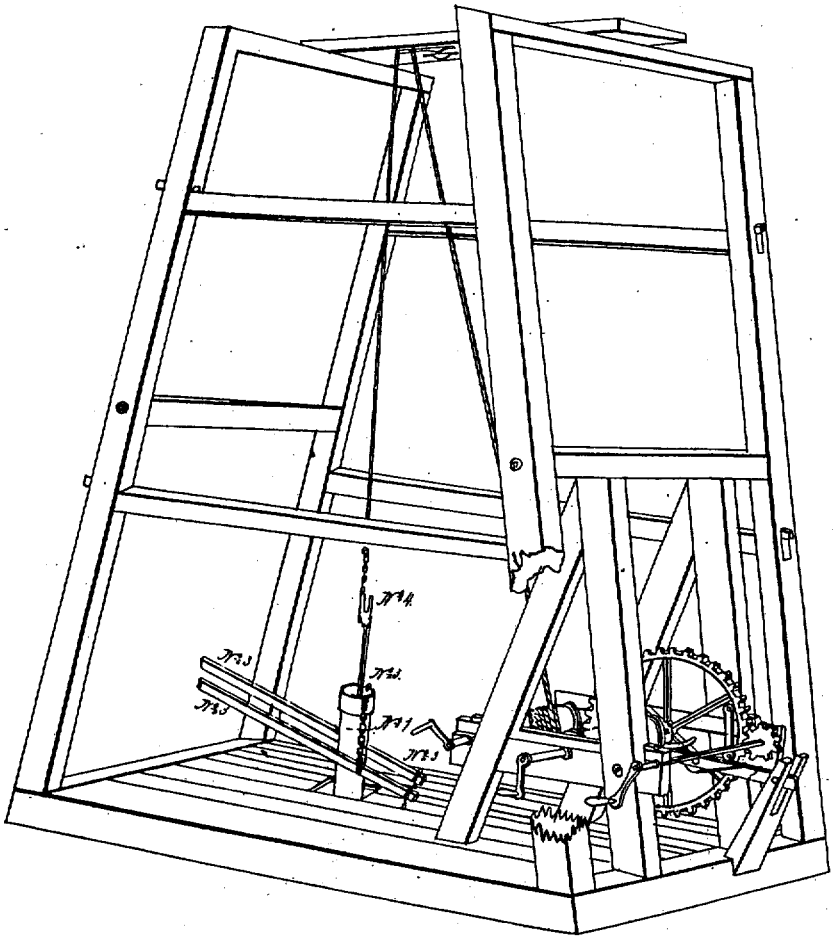

Sheet 2, 2 Sheets.
L. Disbrow.
App's. for Boring in Earth.
Rx NO. 57
6212 Related Doc
REISSUED OCT. 20, 1843
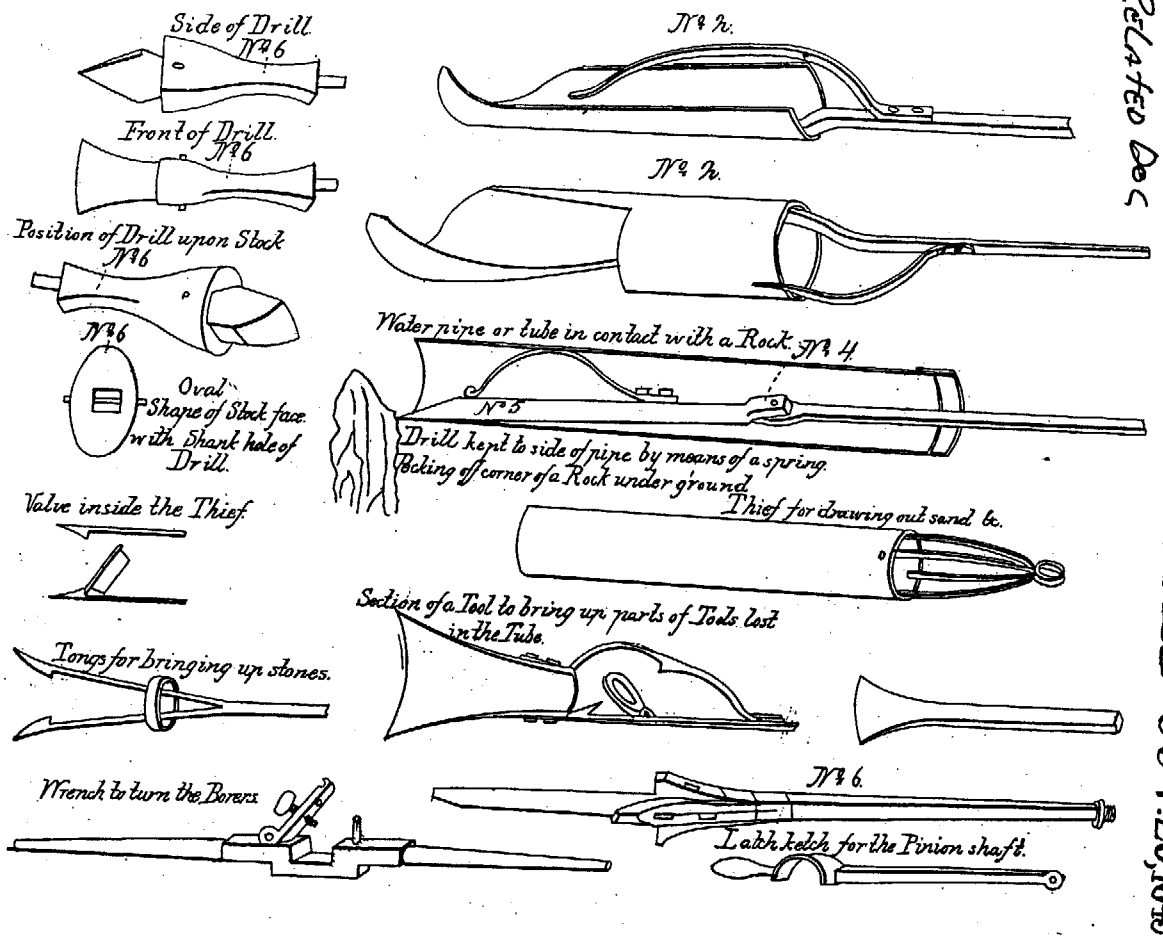

UNITED STATES PATENT OFFICE.

Rx 57

LEVI DISBROW, OF SYRACUSE, NEW YORK.

IMPROVEMENT IN APPARATUS FOR BORING EARTH FOR WATER.

6212 RELATED DOC

Specification forming part of Letters Patent dated November 1, 1830; Reissue No. 57, dated October 20, 1843.

*To all whom it may concern:*

Be it known that I, LEVI DISBROW, of Syracuse, in the county of Onondaga and State of New York, have invented a new and useful Method of Boring the Earth for Water and for other Purposes, which is described as follows, reference being had to the annexed drawings of the same, making part of this specification.

Figure 1 is a perspective view of the machinery to facilitate the operation of boring; Fig. 2, the pod, auger, or cylinder for boring. Fig. 3 represents the spring-chisel. Fig. 4 represents the reaming-bit. Fig. 5 represents the rock-boring tools. Fig. 6 represents the sand-bucket. Fig. 7 represents a section of same. Fig. 8 represents the tool-lifter or sheriff for taking up broken tools. Fig. 9 represents the yoke or wrench. Fig. 10 represents the tongs for bringing up stones.

The tubes A, for sinking into the earth as the boring progresses, are made of metal or wood, or both in part, or of any suitable material, and of a size proportioned to the magnitude of the work to be performed or object to be attained. A medium length is about six feet, with a caliber of eight inches of an equal bore throughout. The ends of the tubes are squared and fitted to match, and the joints are also secured with metal bands B, each section or piece of tube having a band put on its end and let into it the thickness of said band and half its width, in order to extend beyond the end of the said section of tube, and thus form a socket to receive the end of the next piece of tube, so as to form a close strong joint. The bands may be further secured with nails or pins or otherwise. The first or bottom tube should be prepared with great care. I therefore make a strong wide wrought-iron band, which is well secured to the lower tube, and which is a little bell-shaped or conical, so that it is larger at the lower end than any other tube that may follow, and diminished from the inside to the bottom to nearly a cutting-edge, for the purpose of making the bore larger than the diameter of the tube, that it may slip down easily as the work progresses.

Second. The pod, auger, or cylinder bit C for boring the earth is made of iron or other suitable material and pointed with steel, and is provided with a spring, D, of an oval or other shape, which is bolted to the shank E and extends down to near the point of the auger. The spring and auger are larger in diameter than the outside of the tube, in order that when passed down through the tube the cutting-edges of the auger will cut a hole large enough for the tube to follow, while the pod of the auger will retain the clay, the point of the auger and spring being collapsed or contracted by the concave sides of the tube while being pressed or forced down through the tube to the lower end thereof, and again extended to greater diameter than the tube as soon as the point passes through the tube. By this construction of auger the operator is enabled to bore a hole in the earth below the bell-shaped end of the tube of the same diameter outside, or greater, if required, and to withdraw the auger with the greatest facility by the aforesaid pliability of the point of the auger and the spring for keeping it extended or allowing it to be contracted.

Third. The shaft or shank E is a series of square iron bars about twelve feet long and one inch and a quarter square, connected together by crotch-joints and screws. On the ends of each bar a crotch is formed, into which is inserted a similar crotch formed on the next bar. The two are held together by screws passing each other at right angles. By this means any length of rods may be securely connected possessing the quality of both flexibility and strength. The augers C and other tools are attached to the lower end of this shaft. A yoke, wrench, or handle, F, is used to turn the shaft and augers. It is similar in shape to the stocks for cutting screws, except at the middle portion, where it spans the shaft. It has at that place a hasp and staple, G, in the middle, and also a thumb-screw by which it is made to take hold of the shaft. Each section of the rod or bar has a key-hole near the end thereof for the insertion of a key or arm that is to rest upon a spanner or crotch bar laid over the upper end of the tube for holding the shaft and auger in a suspended state while adding to or taking from the shaft a section or sections of the shaft.

Fourth. The spring-chisel H, secured to the lower end of the shaft, diverging from the line of said shaft and contracting in passing through the tube, and when again extending itself below the lower end of the bottom tube so as to cut a hole of greater diameter than the tube and sufficiently large to allow the tubing to follow, being provided with a spring, I, to confine its action to one side of the hole. The object of this tool is to break or otherwise remove stones and other hard substances that may hinder the passage of the tubing. It is indispensable in hard bottoms.

Fifth. The reaming-bit K is formed by four dies, L, bolted on a square shaft of iron. These dies are set opposite each other on the sides of the shaft, and in order to enlarge the hole the shaft must extend below the dies to keep it central, while the dies are made to cut the circle to the required size. This tool is used in rock-borings to enlarge the bore to receive a pump when a small hole is first made.

Sixth. The rock-boring tools are, first, a set of chisels, M, Fig. 5, fitted with a strong male screw at the top end and pointed at the other end. They are made of square iron, having trimmers welded on the sides transversely to the cutting-edges. These trimmers act the double part of keeping the hole straight and round. The pump or sand bucket N, Fig. 6, is a metal tube with a bail at the top end to fasten a rope to, while the lower end has a valve, *e*. The up and-down motion given to it by the rope draws the borings with the turbid water above the valve in said metal tube, which are thus drawn out.

Seventh, the chains and levers for forcing down the tubing. The levers P are two strong pieces of timber. The fulcrum ends are held to the platform by means of chains or other common means, and the levers are made to act upon the tube by means of two strong chains, Q, each of which is made fast to the top of the tube A, opposite each other, the tube being between the levers and the chains passing down from the top of the tube and around the levers and hooked to the links of the descending part of the chain, and the long ends of the lever, being loaded, creates a steady downward pressure to the tubes as the earth, &c., is removed from below. The platform R is made by laying planks on the sills of the boring-house or by anchoring timbers to the ground, or any common means to form a strong fulcrum. Shear-holes may be substituted for a boring-house and answer for small jobs, but ropes provided with swivel-hooks and windlass are indispensably necessary. When tools accidentally break and are left below, they are taken up by a tool, *s*, which I call a "sheriff." The sheriff is made of iron and steel. I prepare two pieces of iron and weld them to a joint that fits the auger handle or shaft. These pieces are shaped similar to the letter U, with the joint welded to the bottom of the pieces. The other two ends are made flat and are riveted to a funnel-shaped band of iron, T, the large end being as large as the caliber of the tubes. This funnel brings the broken piece to the center and up between the legs of the first piece or letter, U. On one leg I fasten a sharp piece of steel, V, and on the opposite side I fasten a valve, W, so that as the sheriff is pushed down it brings the broken tool directly between the valve and the die on the opposite side, and if it is well arranged it is quite sure of the prisoner.

From the foregoing description of the machinery for boring the earth for water the operation of the several parts will be quite evident; and as to the practical results produced these will be clear to the intelligent mind on reflection. It will be seen that wells on my system of boring and tubing can be sunk in quicksands, marshes, under water, and in other places where it would be very difficult to dig them, and that during the operation the influx of water from the top and sides of the well is prevented by my system of tight tubing, as is evident at Syracuse, where I have bored to great depths, passing through several descriptions of water before reaching the salt-water or strong brine, which is the article sought for at that place.

I do not claim to be the inventor for boring for water, but

1. I do claim to be the original and first inventor of tight tubing, the bore or aperture made in the earth as it progresses by means of tubes made with banded or other joints and slipped down on the shank or stem of the boring-tool as the work progresses, the boring being carried on below the lower or flared end of the bottom section of the tube by means of tools made for that purpose in the manner above set forth.

2. The method herein described, or any other substantially the same, of constructing the instruments or tools employed in boring, drilling, &c., so that they can pass through the pipe or tube and make the hole of sufficient size to receive the outer diameter of the said pipe or tube.

3. Making the lower end of the pipe trumpet-mouthed or bell-shaped, in combination with the construction of the boring-tools, by which the hole is bored of greater diameter than the bore of the tube or pipe, in the manner and for the purpose set forth.

LEVI DISBROW.

Witnesses:
JOHN H. JOHNSON,
IRA F. CLARK.